United States Patent
Koszek

(10) Patent No.: US 11,240,289 B2
(45) Date of Patent: *Feb. 1, 2022

(54) APPARATUS AND METHOD FOR LOW-LATENCY MESSAGE REQUEST/RESPONSE PROCESSING

(71) Applicant: salesforce.com, inc., San Francisco, CA (US)

(72) Inventor: Wojciech A. Koszek, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 16/868,405

(22) Filed: May 6, 2020

(65) Prior Publication Data

US 2020/0267202 A1    Aug. 20, 2020

Related U.S. Application Data

(63) Continuation of application No. 15/836,687, filed on Dec. 8, 2017, now Pat. No. 10,686,862.

(51) Int. Cl.
*G06F 15/16* (2006.01)
*H04L 29/08* (2006.01)
(Continued)

(52) U.S. Cl.
CPC ............. *H04L 67/02* (2013.01); *G06F 9/46* (2013.01); *H04L 67/10* (2013.01);
(Continued)

(58) Field of Classification Search
CPC ....... H04L 67/02; H04L 67/42; H04L 67/322; H04L 67/1008; H04L 69/329
See application file for complete search history.

(56) References Cited

U.S. PATENT DOCUMENTS 7,730,478 B2  6/2010 Weissman
10,459,629 B2  10/2019 Koszek
(Continued)

OTHER PUBLICATIONS

Non-Final Office Action, U.S. Appl. No. 15/836,687, dated Dec. 2, 2019, 8 pages.
(Continued)

*Primary Examiner* — Oleg Survillo
(74) *Attorney, Agent, or Firm* — Nicholson, De Vos, Webster & Elliott, LLP

(57) ABSTRACT

An apparatus and method for low-latency real-time request processing. For example, one implementation comprises a front end and a plurality of micro-services each utilizing a different type of hardware and/or software tailored to perform a specialized type of processing. In one implementation, the front end receives a request message (e.g., an HTTP request) containing program code/data in its header and forwards the request to certain micro-services in accordance with the type of processing required and/or other variables such as load on the micro-services. A central storage may be shared by the front end and the micro-services to exchange data and/or the data may be stored in the intermediate messages passed between the front end and micro-services.

20 Claims, 4 Drawing Sheets

(51) Int. Cl.
*H04L 29/06* (2006.01)
*G06F 9/46* (2006.01)

(52) U.S. Cl.
CPC ........ *H04L 67/1008* (2013.01); *H04L 67/322* (2013.01); *H04L 67/42* (2013.01); *H04L 69/329* (2013.01)

(56) References Cited

U.S. PATENT DOCUMENTS

| | | |
|---|---|---|
| 10,489,390 B2 | 11/2019 | Koszek |
| 2018/0039565 A1* | 2/2018 | Rajagopalan ......... G06F 3/0482 |
| 2018/0039567 A1* | 2/2018 | Rajagopalan ....... G06F 11/3672 |
| 2018/0039570 A1* | 2/2018 | Rajagopalan ....... G06F 11/3688 |
| 2018/0083835 A1* | 3/2018 | Cole ....................... H04L 41/12 |
| 2018/0113707 A1* | 4/2018 | Mora Lopez ......... G06F 9/3013 |
| 2018/0146068 A1* | 5/2018 | Johnston ............... H04L 65/403 |
| 2018/0307514 A1* | 10/2018 | Koutyrine ........... G06F 11/0706 |
| 2018/0321996 A1* | 11/2018 | Riva ....................... G06F 9/547 |
| 2019/0057213 A1* | 2/2019 | Hassan ................. H04L 67/141 |
| 2019/0058761 A1* | 2/2019 | Hassan ................... H04L 67/02 |
| 2019/0087085 A1 | 3/2019 | Koszek |
| 2019/0102424 A1 | 4/2019 | Koszek |
| 2019/0103970 A1 | 4/2019 | Koszek |
| 2019/0166084 A1 | 5/2019 | Koszek |
| 2019/0182114 A1 | 6/2019 | Tavridis et al. |
| 2019/0220184 A1 | 7/2019 | Koszek |
| 2020/0019309 A1 | 1/2020 | Koszek |

OTHER PUBLICATIONS

Notice of Allowance, U.S. Appl. No. 15/836,687, dated Mar. 30, 2020, 9 pages.

\* cited by examiner

APPARATUS AND METHOD FOR LOW-LATENCY MESSAGE REQUEST/RESPONSE PROCESSING

CROSS-REFERENCE TO RELATED APPLICATIONS

This application is a continuation of application Ser. No. 15/836,687, filed Dec. 8, 2017 (now U.S. Pat. No. 10,686,862, issued Jun. 16, 2020), which is hereby incorporated by reference.

TECHNICAL FIELD

One or more implementations relate generally to the field of network-based data processing. More particularly, the implementations relate to an apparatus and method for low-latency request/response processing.

BACKGROUND ART

The Hypertext Transfer Protocol (HTTP) is the primary application layer network protocol used to connect clients with servers over the Internet. While "Web browsers" are the most common client-side software using HTTP to communicate with "Web servers," other client-side apps/applications and server-side applications/services may exchange messages via HTTP.

HTTP is a request-response protocol meaning that an HTTP "message" consists of a request message sent from a client to a server and a response message transmitted from the server to the client, typically containing data requested by the client. The HTTP server may include various back-end components for performing functions required to complete the response. These may include, for example, databases, image/video processing components (potentially using a hardware accelerator for processing images), audio processing components, and compression components, to name a few. Of course, the particular set of back-end components used will depend on the services offered to clients by the Web server.

A typical HTTP request includes an indication of the command to be implemented by the Web server, one or more request-header fields, and (potentially) a message body. A request-header field allows the client to pass additional information related to the request to the server, acting as a request modifier, with semantics equivalent to the parameters of a method invocation of a programming language. Significantly, there are no limits on the size or type of program code which may be embedded within an HTTP request header.

"Micro-services" are a relatively new architecture. In contrast to monolithic designs, which often run on a single, powerful server, micro-services encourage a loosely-coupled design, where a micro-service does just one thing, but does it efficiently and interacts with other micro-services as needed. A micro-service may utilize specialized hardware and software to perform its function extremely efficiently. Moreover, the micro-services architecture allows an application to be decomposed into different smaller services, improving modularity and making the program code easier to understand, design and test. For example, individual micro-services may be modified (e.g., upgraded, swapped out) without affecting the operation of other micro-services used by the application.

However, the existing HTTP processing methods implemented by Web servers do not fit well within the micro-services model, thereby inhibiting the use of micro-services on current platforms. Most requests served by HTTP servers make it hard for it to be specialized. Current HTTP application servers are large, monolithic machines, performing the bulk of data processing to generate a response, and supplying the data and multimedia requested by the client. This makes low-latency and real-time services based on HTTP difficult to implement.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

Figure 1:
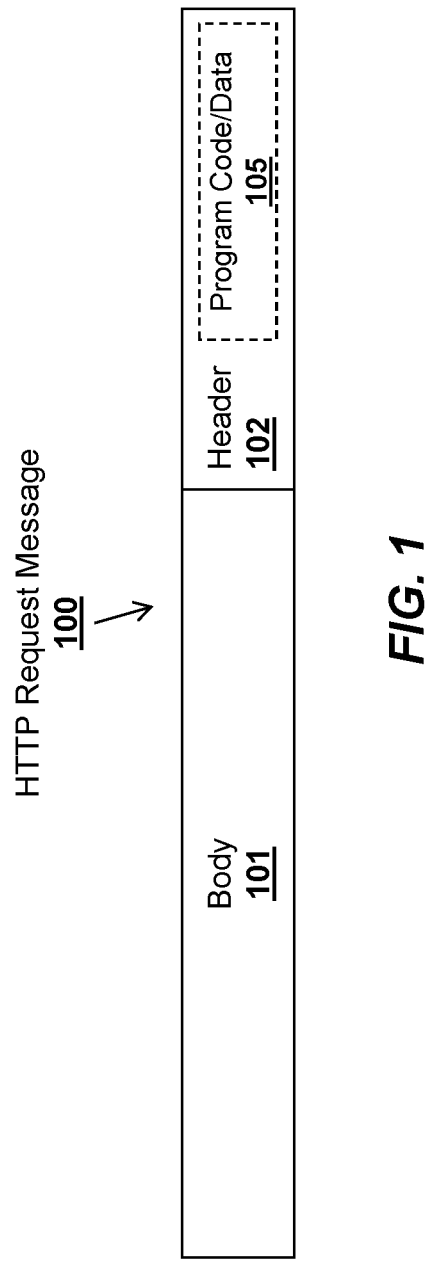
FIG. 1 illustrates an exemplary message request format for transmitting program code/data according to some implementations.

In the following description, for the purposes of explanation, numerous specific details are set forth in order to provide a thorough understanding of the implementations described below. It will be apparent, however, to one skilled in the art that the implementations may be practiced without some of these specific details. In other instances, well-known structures and devices are shown in block diagram form to avoid obscuring the underlying principles described herein.

An architecture and method are described to seamlessly integrate micro-services transactions into an application layer request-response protocol such as the Hypertext Transport Protocol (HTTP). While the implementations described herein focus on HTTP, the underlying principles described herein are not limited to any particular network protocol. For example, the same underlying principles may be implemented within the context of any application layer network protocol under the TCP/IP (Transmission Control Protocol/Internet Protocol) network model or within the session, presentation, or application layers of the Open Systems Interconnection (OSI) network model (assuming that the network protocol includes features similar to the relevant features of HTTP as described herein). As used herein, the term "application layer" refers to the application layer of the TCP/IP standard or any layer of the OSI model above the transport layer.

One implementation takes advantage of the extensibility of HTTP request messages by embedding blocks of program code/data into the HTTP header field. As used herein the term "program code/data" means program code, or data, or both program code and data. By itself, the term "program code" refers to any form of executable script, executable code, and (potentially) associated data to be processed by one or more micro-services. The program code/data may include a script or other executable code which is evaluated and processed by one or more micro-services upon receipt.

As used herein, a "micro-service" is implemented in an electronic device having specialized hardware and/or software tailored to perform a specialized type of processing on input program code/data, and communicatively coupled to one or more other micro-services over a network. A "micro-services architecture" is a loosely-coupled arrangement of such micro-services over a network, where each micro-service performs its specialized type of processing within the context of a larger, overarching operation. As one example, a set of micro-services may be identified and arranged to form an image processing pipeline where a first micro-service performs decoding, a second micro-service performs image processing (e.g., recoloring, shading, resolution adjustment, etc), and a final micro-service performs encoding (e.g., prior to transmission to a client). In the particular implementations described herein, this arrangement of micro-services is performed in response to a client's HTTP request message and the final result of the processing is included in an HTTP response message.

The specialized hardware of the individual micro-services may include specialized accelerators to increase processing throughput for certain types of operations and may also include specific machine configurations such as a particular number of processors, particular types of processors (e.g., (e.g., CPUs, GPUs), particular types of memories (e.g., DDR DRAM, HBM, etc), and particular I/O characteristics, to name a few. While in some implementations some or all the micro-services may be implemented on electronic devices with specialized hardware and software, in others implementations some or all the micro-services may be implemented on electronic devices with generic hardware using specialized software.

In one implementation, the micro-services described herein may either perform processing operations based on the program code/data or may not be selected for processing based on the program code/data. Each of those micro-services selected for processing may perform its respective specialized type of processing on the received program code/data. However, in some cases, a micro-service which has been selected for processing may simply forward the program code/data to a different micro-service (e.g., where the specialized type of processing is not needed, given variables such as the processing performed by prior micro-services and/or the desired intermediate result having been reached). However, in most instances, each of the micro-services will perform its specialized processing on the program code/data received.

Various different message and/or program code formats may be used to exchange intermediate results between micro-services. By way of example, and not limitation, the program code may be written in an existing language and/or using existing data formats, for which interpreters and compilers are readily integrated into the micro-services. Alternatively, or in addition, the program code may be written in a proprietary language interpretable by proprietary micro-services. Some examples of exemplary program code are presented below.

FIG. 1 illustrates an exemplary message request format for transmitting program code/data according to some implementations. Specifically, an HTTP request message 100 is illustrated which includes a message body 101 and header field 102 formatted in accordance with the HTTP protocol. The header field 102 is extended to include program code and/or data 105 to be processed by one or more micro-services as described below.

Figure 2:
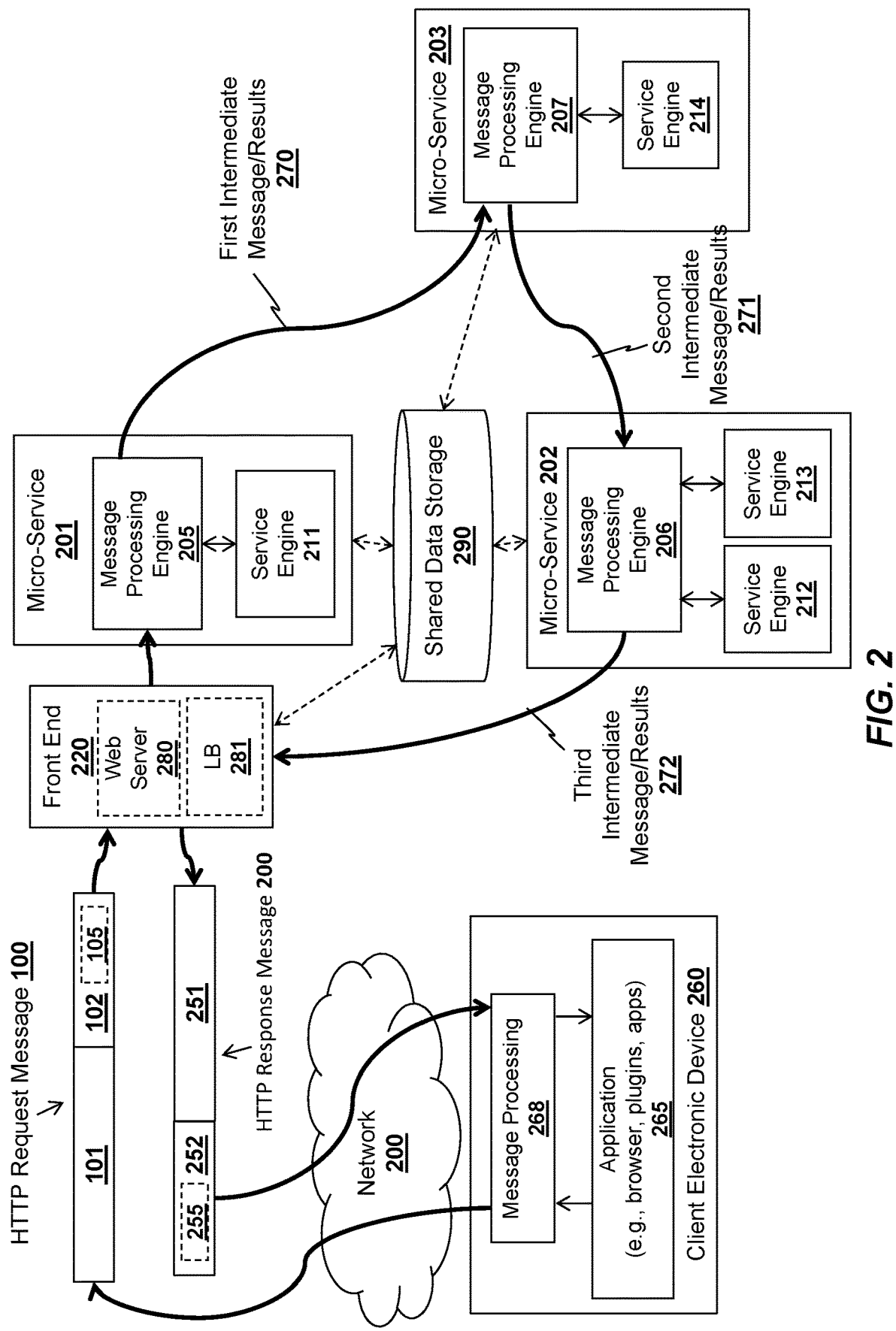
FIG. 2 illustrates an exemplary micro-services architecture including a set of micro-services arranged to process messages according to some implementations.

FIG. 2 illustrates an exemplary micro-services architecture including a set of micro-services arranged to process messages according to some implementations. An exemplary client electronic device 260 is shown transmitting an HTTP request message 100 to a plurality of microservices 201-203 over a network 200 (e.g., the Internet). In this implementation, the request message 100 is initially received by a front end 220 which may include, for example, a Web server 280 and/or load balancer 281. As used herein, a "front end," implemented in one or more electronic devices, initially receives an application layer request message transmitted from a client electronic device (e.g., an HTTP request message) and, following processing by itself and/or one or more of the group of micro-services, transmits an application layer response message to the client electronic device (e.g., an HTTP response message). The Web server 280 is to receive/generate HTTP messages.

Certain types of requests may be serviced directly by the Web server component 280 of the front end 220 which may responsively generate the HTTP response message 200 without interacting with the micro-services 201-203. For other types of requests, the front end 220 may determine at least a first micro-service of the micro-services to perform processing of the program code/data 105 based on an evaluation of the program code/data 105 in the header of the HTTP request message, and transmit an initial message to the first micro-service of a series of the micro-services.

The load balancer 281 may determine a load on each of a group of micro-services to aid in selecting one of the micro-services from the group based on the load. The load balancer 281 of the front end 220 (if used) may forward the message based on the current load on each of the micro-services 201-203. For example, micro-service 201 may perform the same function as other micro-services (not shown) and may be selected as the first micro-service because it has a relatively smaller workload than the other micro-services. A similar analysis of current load may be performed for the other micro-services 202-203. In one implementation, each of the micro-service 201-203 (including those which are not shown), may periodically report statistics related to a current workload to a shared data storage 290 (e.g., a database or other type of central data storage system). The load balancer 281 may then use these statistics to make decisions related to message forwarding (e.g., sending the current request message 100 those micro-services having the smallest workload).

In the specific example shown in FIG. 2, the front end 220 forwards the request message 100 to micro-service 201. Alternatively, the front end 220 and the micro-services 201-203 may use a different messaging format (e.g., a proprietary one) for internal communication between them. In such a case, the program code/data 105 (or modified version thereof) may be stored in a message packet using the internal (and possibly propriety) messaging format and/or in a shared data storage 290 as described below.

Regardless of the messaging format used, each of the illustrated micro-services 201, 202 and 203 are implemented in one or more electronic devices and utilize a different type of hardware and/or software tailored to respectively perform a specialized type of processing different from the types of processing performed by the other micro-services 201-203. Wherein each the micro-services 201-203 is to receive an input, process that input using its specialized type of processing, determine a next step, and transmit its result according to that next step. The first micro-service 201 processes as the input the program code/data using its specialized type of processing to generate an intermediate result and transmits it to a next micro-service in the series of micro-services based on a determination of a next type of processing required. Each remaining micro-service (203 and 202) in the series of micro-services, responsive to receipt of an intermediate result from a preceding one in the series of micro-services, processes the intermediate result using its specialized type of processing, determines the next step to be a next one of the micro-services in the series of micro-services (in the case of micro-service 203) or the front end (in the case of micro-service 202), and transmit its result accordingly.

In one implementation, each of the micro-services 201-203 includes a message processing engine 205, 206, and 207, respectively, for receiving messages and service engines 211, 212-213, and 214, respectively, for executing application-specific instructions in response to the contents of the messages and formulating a response. By way of example, and not limitation, the message processing engines 205-207 may implement message routing, flow control, quality of service (QoS) calculations (e.g., to keep latency at a desired level as discussed in some examples below). The service engines 211-214 may each be application-specific program code, the execution of which causes operations unique to its respective micro-service 201-203, potentially using hardware acceleration (e.g., such as described in the image processing example below).

In one implementation, the particular response generated by a service engine 211-214 is dependent on the content of the HTTP request message 100 received. For example, in some cases, the first service engine 211 may formulate a complete response without involving the other micro-services 202-203. In other implementations, the message or intermediate messages/results are passed through multiple micro-services 201-203 (a series of micro-services), with the micro-services performing different types of operations (each performing its specialized type of processing that is different than the types of processing performed by the other micro-services) to produce a result before the transmission of an HTTP response message 200 containing that final result to the client electronic device 260.

For example, micro-service 201 may perform a first set of operations on the program code/data 105 from the HTTP request message 100 to generate a first intermediate result which it then transmits to micro-service 203 via a first intermediate message 270. In general, service engine 214 on micro-service 203 will implement a different set of operations on the first temporary result than those implemented by service engine 211 on micro-service 201. That is, each micro-service 201-203 may be uniquely configured to efficiently perform a different set of operations on the data/results received, potentially using a hardware accelerator and associated software (e.g., a driver to access the hardware accelerator). For example, in an image processing arrangement, service engine 211 may include hardware/software for accelerated decompression, service engine 214 may include hardware/software for accelerated shading/coloring/scaling, and one or both of service engines 212-213 may include hardware/software for accelerated image encoding. In this manner, the plurality of micro-services 201-203 may be coupled together to form a complete image processing pipeline, thereby alleviating the load on the front end server 220.

In one implementation, the various micro-services 201-203 and front end 220 share data as needed through a database or other form of shared data storage 290. For example, the first intermediate message 270 may include a link to the result generated by the service engine 211 and stored in the shared data storage 290. The second service engine 214 of the second micro-service 203 then uses the link to retrieve the result from the shared data storage 290 to generate the second result, which it stores back in the shared data storage 290 for the next service engines 212-213. Instead of a formal database architecture, the shared data storage 290 may be a high speed shared memory such as a High Bandwidth Memory (HBM) or other form of high speed storage.

In one implementation, after receiving the HTTP request message 100, the message processing engine 205 of micro-service 201 parses the header to extract the program code/data 105. In some instances the message processing engine 205 may itself process the program code/data (e.g., for network/packet related processing) and/or may pass the program code/data to the service engine 211. In one implementation, the message processing engine 205 processes a first portion of the program code/data 105 and passes a second portion to the message processing engine 211. The service engine 211 and/or message processing engine 205 may process the program code/data 105 to generate a first intermediate result. The message processing engine 205 then transmits the first intermediate result in a first intermediate message 270 to the next micro-service 203 for additional processing. The first intermediate message 270 containing the first result may be formatted in a similar manner as HTTP request message 100 (e.g., with data and/or program code generated by the service engine 211 included in an HTTP request header). Alternatively, the first intermediate message 270 may use a different and/or proprietary message format. The underlying principles described herein are not limited to any particular format used for the intermediate messages 270-272 described herein.

In one implementation, the transmission between micro-services 201-203 may be performed by transmitting data packets from one server electronic device (on which micro-service 201 is implemented) to another server electronic device (on which micro-service 203 is running) over a local area network connection (e.g., via a 1000 Gbit/s Ethernet switch). Alternatively, two or more of the microservices 201-203 may be implemented on the same server electronic device with the others connected via the local area network connection. The underlying principles described herein are not limited to any particular network/server arrangement for the micro-services 201-203.

In one implementation, upon receiving the first intermediate message 270, the message processing engine 207 of micro-service 203 parses out the intermediate results which it processes and/or provides to service engine 214. Once again, the particular distribution of processing between the message processing engine 207 and service engine 214 may be based on the content of the intermediate results. For example, the message processing engine 207 performs processing related to networking variables such as latency, routing, load balancing, and Quality of Service guarantees while the service engine 214 performs all other forms of application-level processing (e.g., such as image processing, audio processing, stream compression/encoding, etc).

In one implementation, service engine 214 and/or message processing engine 207 responsively processes the first intermediate result to generate a second intermediate result which message processing engine 207 transmits in a second intermediate message 271. The message processing engine 206 of micro-service 202, in turn, parses out the second intermediate results which it processes and/or provides to one or both of service engines 212-213. The two service engines 212-213 may perform different (but potentially related) types of operations on the intermediate result. Various different service engines may be integrated within a single micro-service depending on the implementation (e.g., where separate sets of operations are needed such as generating different image formats). In any case, the service engines 212 and/or 213 perform their specific set of operations on the second intermediate results to generate a third result. Message processing engine 206 transmits the third intermediate message 272 with the third result back to the front end 220, which formats (as necessary) the third result as a final result and transmits it to client electronic device 260 in HTTP response message 200.

In one implementation, the third result contained in the third intermediate message 272 is substantively the same as the final result which the front end 220 merely incorporates into the HTTP message header 252 for transmission to the client 260. Alternatively, if an HTTP message format is used for communication between the micro-services 201-203, then the third intermediate message 272 is an HTTP message which may simply be forwarded to the client 260. In yet another implementation, the message processing engine 206 generates the final result and sends it directly to message processing engine 268 of the client electronic device 260. By way of another example, the front end 220 may perform additional formatting/processing of the third result before transmitting it to client electronic device 260.

Regardless of how the HTTP response message 200 is provided to client electronic device 260, in one implementation, the message processing engine 268 parses the response message to extract the final result which may be processed by the application 265 and/or rendered within a graphical user interface (GUI) of the application 265. Returning to the image processing example, in an image processing implementation the final processed image may be displayed within a browser window or app window (if the application 265 is a mobile app).

In the above description, the shared data storage 290 may be used to exchange data between the front end 220 and each of the micro-services 201-203. For example, as mentioned, micro-service 203 may store its results in the shared data storage 290 and provide micro-service 202 with a link (e.g., a hyperlink) which points to the data within the shared data storage. In one implementation, program code/data may be exchanged through a combination of message passing and shared data access.

The following example illustrates how the above describe implementations may be used to provide network control functions. This particular example involves a request for a particular image (image.jpg). In response, the message processing engine 268 generates the following command which is sent as an HTTP request message 100:
GET/image.jpg PROGRAM C_EXPECTED {expected_max_latency=15 ms;}S_EVAL{if (request.expected_latency>7 ms){error(102}}

In this example, the GET command is an HTTP command to retrieve a resource from a Web server (the image file "image.jpg"). The code blocks C_EXPECTED and S_EVAL are variables included within the HTTP request message header 102. In one implementation, any code blocks beginning with C_ are related to the client electronic device 260 while any code blocks beginning with S_ are related to one of the servers (e.g., the front end 220 and/or micro-services 201-203). By submitting the C_EXPECTED code block, the client electronic device 260 informs the front end 220 and/or micro-services 201-203 that the maximum acceptable latency for the request is 15 ms. Anything else may be treated by the client electronic device 260 as an error. In one implementation, the S_EVAL block is evaluated on each micro-service 201-203 during the processing of the HTTP request message 100. First, if the expected time for the request will be more than 7 ms, the S_EVAL block instructs the server to return HTTP code 102, informing the client that the request is being processed. The message processing engine 205 on micro-service 201 may evaluate the code block S_EVAL, subtract the time it took to inspect the request, and pass the request as an intermediate result message 270 containing the new value to micro-service 203. Micro-service 201 initially sees an expected maximum latency (expected_max_latency) of 15 ms. Assuming micro-service 201 took 3 ms to process the request, it forwards the request to micro-service 203 as the first intermediate message 270 using an expected maximum latency of 12 ms. In one implementation, it stores this value in the intermediate message header. At any point in a time, if the S_EVAL fails (i.e., falls below 0 or another specified threshold), the message processing engine 205-207 on the micro-service 201-203 detecting the failure can pass the return code of the request back to the client electronic device 260 through the front end 220.

In addition to the network management functions performed by message processing engines 205-207, the micro-services 201-203 include service engines 211-214 which may perform various application-specific functions. For example, when building an API for image processing, the first micro-service 201 may accommodate hardware accelerated decompression, the second micro-service 203 may support hardware accelerated shading, coloring, scaling, and/or other image processing functions, and micro-service 202 may include acceleration hardware for encoding the resulting image. While audio/video media processing is used for the purpose of explanation, the underlying principles described herein are not limited to any particular type of processing. A set of micro-services may be configured to perform any type of processing using differently configured service engines.

In some implementations the micro-services may be fully interconnected with one another over a local high speed network and the order in which processing is performed may be based on the type of program code/data 105 being processed rather than on the manner in which the micro-services are interconnected. Moreover, messages may be sent concurrently to two or more of the micro-services for processing in parallel. This may be done, for example, where the input program code/data used by one micro-service is not dependent on the results generated by the other micro-services. In one implementation, the front end 220 performs a dependency analysis to determine whether parallel execution is possible and/or the order in which the micro-services 201-203 will process the program code/data.

Figure 3:
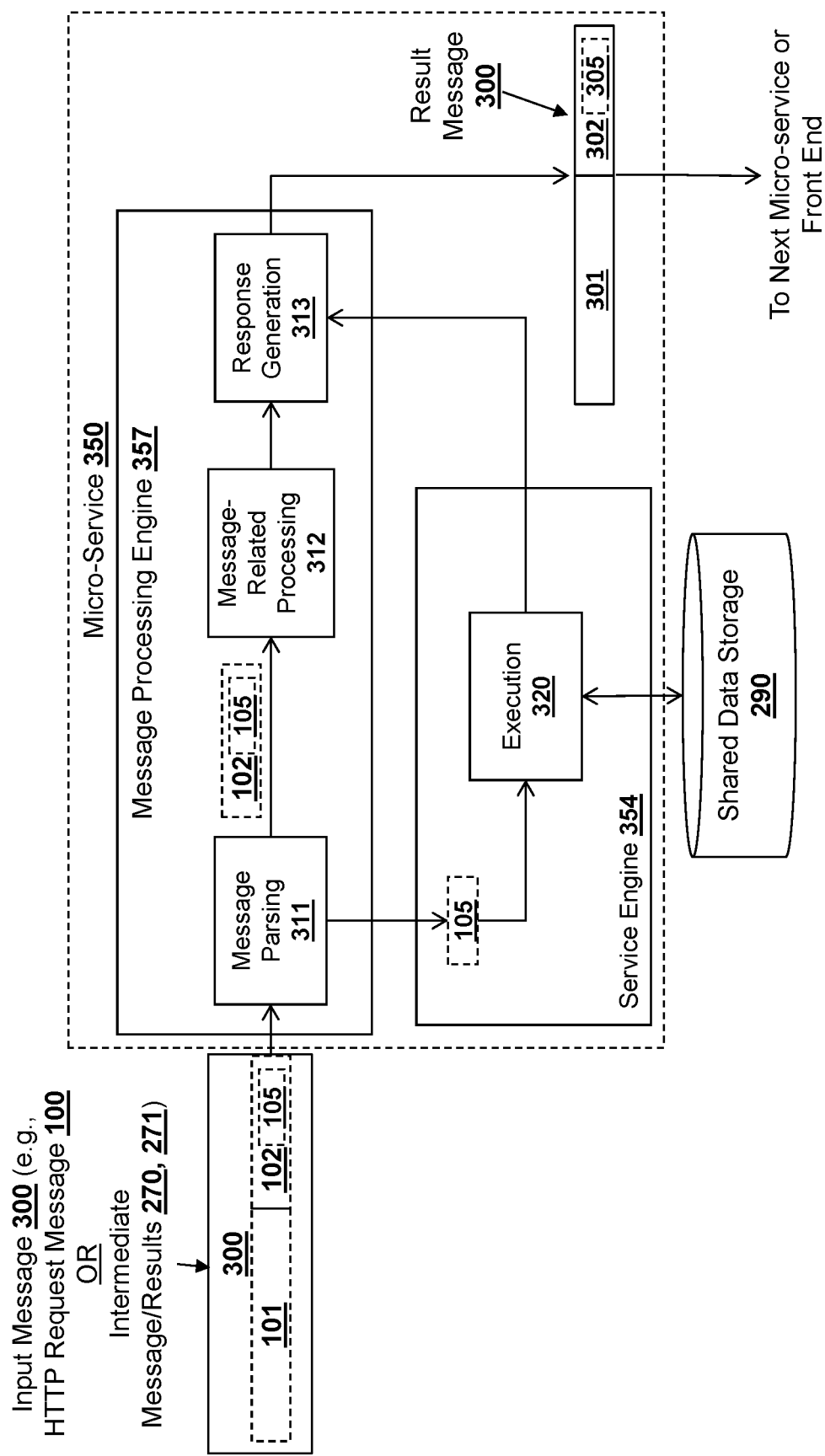
FIG. 3 illustrates additional details of the exemplary message processing engine and service engine of an exemplary micro-service according to some implementations.

FIG. 3 illustrates additional details of the exemplary message processing engine and service engine of an exemplary micro-service according to some implementations. Specifically, FIG. 3 shows a micro-service 350 (e.g., micro-service 201, 202, or 203) that includes a message processing engine 357 (including a message parsing module 311, a message-related processing module 312, and a response generation module 313) and a service engine 354 (including an execution module 320). As discussed above, these micro-service components may be implemented in hardware (e.g., using a specialized accelerator), software, firmware, or any combination thereof. Upon receiving an input message 300, which may be the original HTTP request message 100 or an intermediate message/result (e.g., 270, 271), the message parsing module 311 parses the message (e.g., to extract the program code/data 105). In one implementation, message-related processing module 312 may perform processing on the header 102 and/or program code/data 105 (as in the latency example described above). In addition, the message parsing module 311 may send the program code/data 105, or portions thereof, to execution module 320 of the service engine 354, which may read and/or process temporary results from the shared data storage 290 (e.g., using a link contained in the program code/data 105) and/or which may process the program code/data 105 directly from the message. In either case, a response generation module 313 receives the processing results from the execution module 320 and/or message-related processing module 312 to generate a result message 300 which includes a body 301, header 302, and program code/data 305 (e.g., intermediate message 270, 271, or 272). As mentioned, the message 300 may have a different message format in which the program code/data 305 is included in the message body 301 rather than the message header 302. Alternatively, the message may be formatted as an HTTP request message 100, with the program code/data stored in the header as described above.

Figure 4:
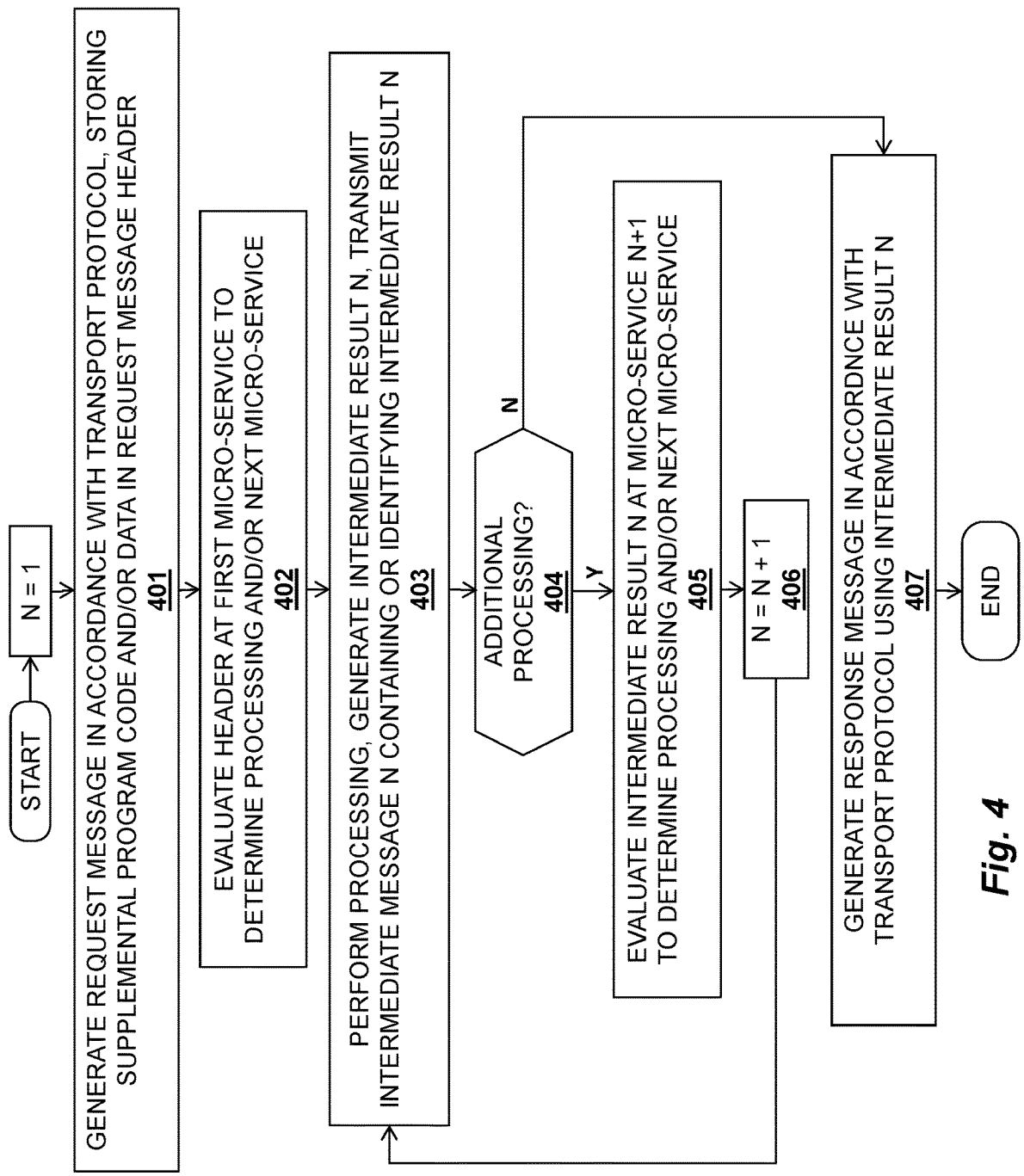
FIG. 4 illustrates a method according to some implementations.

A method in accordance with some implementations is illustrated in FIG. 4. The method may be implemented within the context of the system architectures described above but is not limited to any particular system architecture.

Following initialization of variable N (i.e., setting N=1), at 401 a request message is generated in accordance with the existing network transport protocol, storing supplemental program code/data in the message header. For example, the request message may be generated by an application running on a client electronic device as previously discussed and the transport protocol may be HTTP. However, the underlying principles described herein are not limited to any particular transport protocol.

At 402, the header data is evaluated at a first micro-service to determine the processing to be performed and/or the next micro-service to be used for processing. A front end component (e.g., Web server, load balancer, etc) may initially receive and forward the request message to the first micro-service. In addition, if a proprietary protocol is used for internal communication, the front end component may convert the request message to a new format.

At 403, processing is performed using the program code/data to generate the first intermediate result, and a first intermediate message is transmitted containing or identifying the first intermediate result. The first intermediate message may have the same format as the network transport protocol referenced in 401 (e.g., HTTP), or may use a different and/or proprietary format. Regardless of format, the first intermediate result may be included in the message itself or a link to the intermediate result may be included to identify the location of the first intermediate result in a shared data storage.

If no additional processing is required, determined at 404, then a response message is generated in accordance with the transport protocol using the first intermediate result at 407. For example, in one implementation, the front end generates an HTTP response message containing a final result which may be the first intermediate result or a reformatted version of the first intermediate result.

At 405 the first intermediate result (i.e., where N=1) is evaluated at the second micro-service to determine processing to be performed and/or the next micro-service in sequence. The variable N is incremented at 406 and the process returns to 403, where the second micro-service performs processing to generate a second intermediate result (i.e., with method variable N=2) and transmits a second intermediate message containing the second intermediate result or identifying the second intermediate result. If additional processing is required at 404, then the process repeats any number of times as intermediate results are generated by each micro-service which passes the intermediate results to the next micro-service in sequence.

When no further processing is required, then at 407 a response message is generated in accordance with the transport protocol using the Nth intermediate result (i.e., where N is dependent on the number of iterations performed by the method). As mentioned, the Nth intermediate result may be converted to the final result which, in one implementation, is included in an HTTP packet header. Program code on the client electronic device may then process the final result, potentially generating one or more additional request messages.

Specific Applications and Architectures

The implementations described above may used for different types of applications (implemented by program code in the service engines 211-214) and within different types of architectures (e.g., cloud-based and/or client-server architectures). Some examples are provided below for explanatory purposes. However, the underlying principles described herein are not limited to the specific details set forth in these examples.

Each of the electronic devices (also referred to as a computing device, computer, etc) discussed above includes hardware and software, such as a set of one or more processors coupled to one or more machine-readable storage media (e.g., magnetic disks, optical disks, read only memory (ROM), Flash memory, phase change memory, solid state drives (SSDs)) that stores code (which is composed of software instructions and which is sometimes referred to as computer program code or a computer program) for execution on the set of processors and/or that stores data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, electronic devices (sometimes referred to as server electronic devices) may execute code that cause them to operate as the above described front end and micro-services to provide an application/service to another electronic device(s) (referred to above as a client electronic device, but also known as a client computing device, or a client device) that executes client software (sometimes referred to as client code or an end user client) to communicate with the service. The server and client electronic devices may be operated by users respectively in the roles of administrator (also known as an administrative user) and end user.

Implementations within the context of various exemplary "cloud computing" services are described below. Cloud computing services provide shared resources, software, and information to computers and other devices upon request. In cloud computing environments, software can be accessible over the internet rather than installed locally on in-house computer systems. Cloud computing typically involves over-the-Internet provision of dynamically-scalable and often virtualized resources. Technological details can be abstracted from the users, who no longer need expertise in, or control over, the technology infrastructure "in the cloud" that supports them.

Cloud computing may be provided using the models of infrastructure as a service (IaaS), platform as a service (PaaS), software as a service (SaaS), and data as a service (DaaS). Any of these models may be implemented within a cloud-based "data center" comprised of various computing resources (e.g., servers, routers, load balancers, switches, etc) which may be accessed in accordance with the implementations described above.

IaaS is the most basic model. Providers of IaaS offer physical or virtual computers (i.e., using virtual machines) and other resources such as a virtual-machine disk image library, storage resources, including file-based storage, firewalls, load balancers, IP addresses, virtual local area networks (VLANs), and software bundles. IaaS providers may supply these resources dynamically, from large pools installed in data centers. To deploy their applications, cloud users install operating system images and application software on the cloud resources. In this model, the cloud user maintains the operating systems and the application software. Cloud providers typically bill users based on the amount of resources allocated and consumed.

In the PaaS model, cloud providers deliver a complete computing platform, typically including an operating system, Web server, programming language execution environment, and database. Application developers develop and run software solutions on this cloud platform without the cost and complexity associated with buying and managing the underlying hardware and software layers. In some PaaS implementations, the underlying resources (e.g., computing, storage, etc) scale automatically to match application demand so that the cloud user does not have to allocate resources manually.

In the SaaS model, cloud providers install and maintain application software in the cloud and cloud users access the software from cloud clients (sometimes referred to as an "on-demand software" model). This eliminates the need to install and run the application on the cloud user's own computers, which simplifies maintenance and support. Cloud applications offer virtually unlimited scalability (in contrast to locally executed applications) which may be achieved by cloning tasks onto multiple virtual machines during run-time to meet changing work demand. Load balancers distribute the work over the set of virtual machines transparently to the user (who sees only a single access point).

In addition to different cloud architectures, the implementations may be employed in different types of applications including customer relationship management (CRM) applications. Customer relationship management (CRM) is a term that refers to practices, strategies, and technologies that companies/vendors use to manage and analyze customer interactions and data throughout the customer lifecycle, with the goal of improving business relationships with customers, assisting in customer retention, and driving sales growth (e.g., Sales Cloud by salesforce.com, Inc.). A CRM system is designed to compile information about customers across different channels (e.g., points of contact between the customer and the company such as the company's website, telephone, live chat, direct mail, marketing materials, and social media to name a few examples). A CRM system can also give customer-facing staff detailed information about a particular customer's personal information, purchase history, buying preferences, and concerns.

The implementations may also be employed within a social networking service, which is an online service, platform, or site that focuses on facilitating the building of social networks or social relations among people who may share interests, activities, real-life connections, or backgrounds. A social networking service consists of a representation or profile for each user, his/her social links, and a variety of additional services. Most social network services are web-based and provide a way for users to interact over the internet, such as e-mail and instant messaging. Social networking sites allow users to share ideas, activities, events, and interests within their individual networks. Popular social networking services include Chatter®, Facebook™, LinkedIn®, Twitter®, Google+®, Yammer®, Jive® YouTube™, Foursquare™ Yelp™, Expedia™, MySpace™, and Flickr™. Some of these services operate as or include enterprise social networking services. Some enterprise social networking systems can be implemented in various settings, including organizations. For instance, an enterprise social networking service can be implemented to connect users within an enterprise such as a company or business partnership, or a group of users within such an organization to share data, communicate, and collaborate with each other for various social purposes often involving the business of the organization.

In some enterprise social networking systems, users can access one or more social network feeds, which include information updates presented as items or entries in the feed. Such a feed item can include a single information update or a collection of individual information updates. A feed item can include various types of data including character-based data, audio data, image data and/or video data. A social networking feed can be displayed in a graphical user interface (GUI) on a display device such as the display of a computing device as described below.

Other examples of applications/services which may benefit from the implementations include contracts/proposals/quotes services (e.g., Salesforce CPQ by salesforce.com, Inc.), customer support services (e.g., Service Cloud and Field Service Lightning by salesforce.com, Inc.), marketing services (e.g., Marketing Cloud, Salesforce DMP, and Pardot by salesforce.com, Inc.), commerce services (e.g., Commerce Cloud Digital, Commerce Cloud Order Management, and Commerce Cloud Store by salesforce.com, Inc.), communication with external business data sources (e.g., Salesforce Connect by salesforce.com, Inc.), productivity services (e.g., Quip by salesforce.com, Inc.), database as a service (e.g., Database.com™ by salesforce.com, Inc.), analytics services (e.g., Einstein Analytics, Sales Analytics, and/or Service Analytics by salesforce.com, Inc.), community services (e.g., Community Cloud and Chatter by salesforce.com, Inc.), Internet of Things services (e.g., Salesforce IOT and IoT Cloud by salesforce.com, Inc.), and industry specific services (e.g., Financial Services Cloud and Health Cloud by salesforce.com, Inc.).

The implementations may also be employed within the context of a "multi-tenant architecture" which provides a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

The term "user" is a generic term referring to an entity (e.g., an individual person) using a system and/or service. A user may have one or more roles relative to the system and/or service. A tenant is a group of users who share a common access with specific privileges to a software instance. Thus, a tenant may be an organization (e.g., a company, department within a company, etc). A tenant may have one or more roles relative to a system and/or service. For example, in the context of a customer relationship management (CRM), a tenant may be a vendor using the CRM to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor, customer), a representative (e.g., an administrator) of the company providing the system and/or service, and/or a representative (e.g., a programmer) of a third-party application developer that is creating and maintaining an application(s) on a Platform as a Service (PAAS).

As used herein, the term multi-tenant database management system (DBMS) refers to those systems in which various elements of hardware and software of the database management system may be shared by one or more tenants. For example, a given application server may simultaneously process requests for a great number of tenants, and a given database table may store rows for a potentially much greater number of tenants.

Various forms of database technologies may be used to implement the shared data storage 290 described above. In particular, databases may be implemented according to a variety of different database models (e.g., relational, non-relational (also referred to as schema-less and NoSQL; e.g., key-value store, document store (also known as document-oriented as they store document-oriented information (also known as semi-structured data), graph, columnar (also known as extensible record; e.g., HBase), object, tabular, tuple store, multi-model). A database may comprise one or more database objects that are managed by a DBMS, each database object may include a number of records, and each record may comprise of a set of fields. A record may take different forms based on the database model being used and/or specific database object to which it belongs; for example, a record may be: 1) a row in table of a relational database; 2) a JavaScript Object Notation (JSON) document; 3) an Extensible Markup Language (XML) document; 4) a key-value pair; etc. A database object can be unstructured or have a structure defined by the database service (a standard database object) and/or defined by a user (custom database object). In some implementations of a cloud database (a database that runs on a cloud platform and that is provided as a database service), identifiers are used instead of database keys, and relationships are used instead of foreign keys.

While implementations may use one or more types of databases, a relational database with tables is sometimes described to simplify understanding. In the context of a relational database, each relational database table (which is a type of database object) generally contains one or more data categories logically arranged as columns according to a schema, where the columns of the relational database table are different ones of the fields from the plurality of records, and where each row of the relational database table are different ones of a plurality records and contains an instance of data for each category defined by the fields. Thus, the fields of a record are defined by the structure of the database object to which it belongs. By way of example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields.

In the foregoing, specific exemplary implementations have been described. It will, however, be evident that various modifications and changes may be made thereto without departing from the broader spirit and scope of the invention as set forth in the appended claims. The specification and drawings are, accordingly, to be regarded in an illustrative rather than a restrictive sense.

Throughout this detailed description, for the purposes of explanation, numerous specific details were set forth in order to provide a thorough understanding. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:
1. A method comprising:
   receiving an application-layer request message from a client electronic device, the application-layer request message including program data;
   transmitting an initial message to a first micro-service of a series of micro-services associated with the program data, wherein the series of micro-services are selected from a plurality of micro-services, each micro-service in the plurality of micro-services utilizes different hardware or software for processing, and the first micro-service provides a first type of processing;

processing the program data at the first micro-service using the first type of processing to generate an intermediate result;

providing the intermediate result to a second micro-service in the series of micro-services based on a determination of a second type of processing required by the program data;

generating responsive to receipt of a final result from a last micro-service in the series of micro-services, an application-layer response message using the final result; and transmitting the application-layer response message to the client electronic device.

2. The method of claim 1, wherein the first micro-service comprises a first type of hardware accelerator to perform the first type of processing on the program data.

3. The method of claim 1 further comprising:

storing the intermediate result in a data storage service coupled to the plurality of micro-services; and transmitting to the second micro-service an intermediate message with a link that points to the intermediate result in the data storage service.

4. The method of claim 1, further comprising:

identifying a current load on each of the plurality of micro-services; and selecting the first micro-service based on the current load on the first micro-service relative to a current load on another micro-service in the plurality of micro-services, wherein the another micro-service is implemented in an electronic device with a same type of hardware or software to perform a same type of processing as the first micro-service.

5. The method of claim 1, wherein each of the plurality of micro-services are to:

perform network-related operations in accordance with the program data; and perform application-specific operations in accordance with the program data or an intermediate result.

6. The method of claim 5, wherein the network-related operations comprise evaluating quality-of-service or latency requirements specified in the program data.

7. The method of claim 6, wherein the program data is to specify a maximum latency which the client electronic device will accept, wherein each micro-service in the plurality of micro-services are to evaluate the program data to determine whether a latency in processing the application-layer request message will rise above a maximum latency and, if so, to transmit a message informing the client electronic device.

8. The method of claim 5, wherein the application-specific operations comprise image processing operations, wherein the first micro-service is to decode an image to generate a decoded image and the second micro-service in the series of micro-services is to perform modifications to the decoded image to generate a modified image, and wherein the intermediate result of the first micro-service comprises the decoded image used by the second micro-service to generate an intermediate result comprising the modified image.

9. The method of claim 1, further comprising:

updating the application-layer request message with identification codes uniquely identifying the series of micro-services.

10. A non-transitory machine-readable medium having instructions stored thereon which, when executed by one or more machines, causes the one or more machines to:

receive an application-layer request message from a client electronic device, the application-layer request message including program data;

transmit an initial message to a first micro-service of a series of micro-services associated with the program data, wherein the series of micro-services are selected from a plurality of micro-services, each micro-service in the plurality of micro-services utilizes different hardware or software for processing, and the first micro-service provides a first type of processing;

process the program data at the first micro-service using the first type of processing to generate an intermediate result;

provide the intermediate result to a second micro-service in the series of micro-services based on a determination of a second type of processing required by the program data;

generate responsive to receipt of a final result from a last micro-service in the series of micro-services, an application-layer response message using the final result; and transmit the application-layer response message to the client electronic device.

11. The non-transitory machine-readable medium of claim 10, wherein the first micro-service comprises a first type of hardware accelerator to perform the first type of processing on the program data.

12. The non-transitory machine-readable medium of claim 10, wherein the instructions further cause the one or more machines to:

store the intermediate result in a data storage service coupled to the plurality of micro-services; and transmit to the second micro-service an intermediate message with a link that points to the intermediate result in the data storage service.

13. The non-transitory machine-readable medium of claim 10, wherein the instructions further cause the one or more machines to:

identify a current load on each of the plurality of micro-services; and select the first micro-service based on the current load on the first micro-service relative to a current load on another micro-service in the plurality of micro-services, wherein the another micro-service is implemented in an electronic device with a same type of hardware or software to perform a same type of processing as the first micro-service.

14. The non-transitory machine-readable medium of claim 10, wherein each of the plurality of micro-services are to:

perform network-related operations in accordance with the program data; and perform application-specific operations in accordance with the program data or an intermediate result.

15. The non-transitory machine-readable medium of claim 14, wherein the network-related operations comprise evaluating quality-of-service or latency requirements specified in the program data.

16. The non-transitory machine-readable medium of claim 15, wherein the program data is to specify a maximum latency which the client electronic device will accept, wherein each micro-service in the plurality of micro-services are to evaluate the program data to determine whether a latency in processing the application-layer request message will rise above a maximum latency and, if so, to transmit a message informing the client electronic device.

17. The non-transitory machine-readable medium of claim 14, wherein the application-specific operations comprise image processing operations, wherein the first micro-service is to decode an image to generate a decoded image and the second micro-service in the series of micro-services is to perform modifications to the decoded image to generate a modified image, and wherein the intermediate result of the first micro-service comprises the decoded image used by the second micro-service to generate an intermediate result comprising the modified image.

18. The non-transitory machine-readable medium of claim 1, wherein the instructions further cause the one or more machines to:

update the application-layer request message with identification codes uniquely identifying the series of micro-services.

19. An electronic device, comprising:

a set of memory components; and a processor coupled to the set of memory components, wherein the set of memory components store instructions which, when executed by the processor, cause the electronic device to:

receive an application-layer request message from a client electronic device, the application-layer request message including program data;

transmit an initial message to a first micro-service of a series of micro-services associated with the program data, wherein the series of micro-services are selected from a plurality of micro-services, each micro-service in the plurality of micro-services utilizes different hardware or software for processing, and the first micro-service provides a first type of processing;

process the program data at the first micro-service using the first type of processing to generate an intermediate result;

provide the intermediate result to a second micro-service in the series of micro-services based on a determination of a second type of processing required by the program data;

generate responsive to receipt of a final result from a last micro-service in the series of micro-services, an application-layer response message using the final result; and transmit the application-layer response message to the client electronic device.

20. The system of claim 19, wherein the instructions when executed by the processor further cause the electronic device to:

store the intermediate result in a data storage service coupled to the plurality of micro-services; and transmit to the second micro-service an intermediate message with a link that points to the intermediate result in the data storage service.

* * * * *